United States Patent
Nagel et al.

(10) Patent No.: US 9,365,377 B2
(45) Date of Patent: Jun. 14, 2016

(54) SPLICING TAPE WITH ADJACENTLY DISPOSED STRIPS OF LAMINATING COMPOSITION AND METHOD OF USING THE SPLICING TAPE

(75) Inventors: Christoph Nagel, Hamburg (DE); Niels Czerwonatis, Hamburg (DE); Stefan Wulf, Mönchengladbach (DE); Jens Nootbaar, Hamburg (DE)

(73) Assignee: tesa SE, Norderstedt (DE)

( * ) Notice: Subject to any disclaimer, the term of this patent is extended or adjusted under 35 U.S.C. 154(b) by 208 days.

(21) Appl. No.: 12/638,610

(22) Filed: Dec. 15, 2009

(65) Prior Publication Data

US 2011/0132539 A1     Jun. 9, 2011

(30) Foreign Application Priority Data

Dec. 8, 2009  (DE) .......................... 10 2009 047 680

(51) Int. Cl.
| | |
|---|---|
| *B32B 3/10* | (2006.01) |
| *B32B 37/12* | (2006.01) |
| *C09J 7/02* | (2006.01) |
| *B32B 38/18* | (2006.01) |
| *B65H 19/10* | (2006.01) |

(52) U.S. Cl.
CPC ............. *B65H 19/102* (2013.01); *C09J 7/0296* (2013.01); *B32B 3/10* (2013.01); *B32B 37/12* (2013.01); *B32B 38/18* (2013.01); *B65H 2301/41766* (2013.01); *C09J 2201/128* (2013.01); *C09J 2201/606* (2013.01); *C09J 2203/342* (2013.01); *C09J 2400/283* (2013.01); *Y10T 156/10* (2015.01); *Y10T 428/24851* (2015.01)

(58) Field of Classification Search
None
See application file for complete search history.

(56) References Cited

U.S. PATENT DOCUMENTS

| | | | |
|---|---|---|---|
| 5,996,927 A | 12/1999 | Weirauch et al. | |
| 6,488,228 B2 | 12/2002 | Davies et al. | |
| 6,627,023 B1 * | 9/2003 | Gleichenhagen et al. | 156/157 |

(Continued)

FOREIGN PATENT DOCUMENTS

| | | | |
|---|---|---|---|
| CA | 2383553 | * 11/2002 | ............. B65H 19/18 |
| CA | 2383553 A1 | 9/2009 | |

(Continued)

OTHER PUBLICATIONS

German Search Reported dated Dec. 8, 2009.

(Continued)

*Primary Examiner* — Gerard Higgins
*Assistant Examiner* — Sathavaram I Reddy
(74) *Attorney, Agent, or Firm* — Norris McLaughlin & Marcus, P.A.

(57) ABSTRACT

A splicing tape and a method of using such tape to equip a wound roll for flying splice. The tape includes a first and second carrier and two strips of laminating composition disposed between them, each strip joining the first carrier to the second carrier. The carriers have a first and a second layer of pressure-sensitive, laminating composition and a first and a second layer of pressure-sensitive adhesive. The strips of laminating composition are disposed such that they are not in direct contact with one another. They form a predetermined breakage point. The splicing tape is adhered to the roll such that part of the first layer of pressure-sensitive adhesive forms a first bonding area, the end region of the uppermost ply of the wound roll, and the second layer of pressure-sensitive adhesive forms a second bonding area to the roll, which is located partly below the first bonding area.

11 Claims, 1 Drawing Sheet

(56) References Cited

U.S. PATENT DOCUMENTS

| | | | |
|---|---|---|---|
| 6,637,697 B1 | 10/2003 | Wienberg | |
| 7,087,278 B2 * | 8/2006 | Eikmeier et al. | 428/40.1 |
| 2002/0056784 A1 | 5/2002 | Davies et al. | |
| 2002/0172790 A1 | 11/2002 | Nagel et al. | |

FOREIGN PATENT DOCUMENTS

| | | |
|---|---|---|
| DE | 4033900 A1 | 10/1991 |
| DE | 19956442 A1 | 1/2001 |
| DE | 10123981 A1 | 1/2003 |
| EP | 970904 A1 | 11/2000 |
| EP | 1076026 A2 | 2/2001 |
| EP | 1318962 A2 | 6/2003 |
| EP | 1604927 A1 | 12/2005 |
| EP | 164030 A1 | 3/2006 |
| EP | 1630116 A2 | 3/2006 |
| EP | 1318962 B1 | 5/2006 |
| WO | 9425380 A1 | 11/1994 |
| WO | 9529115 A1 | 11/1995 |
| WO | 0224562 A2 | 3/2002 |

OTHER PUBLICATIONS

International Search Report dated Feb. 10, 2011.

* cited by examiner

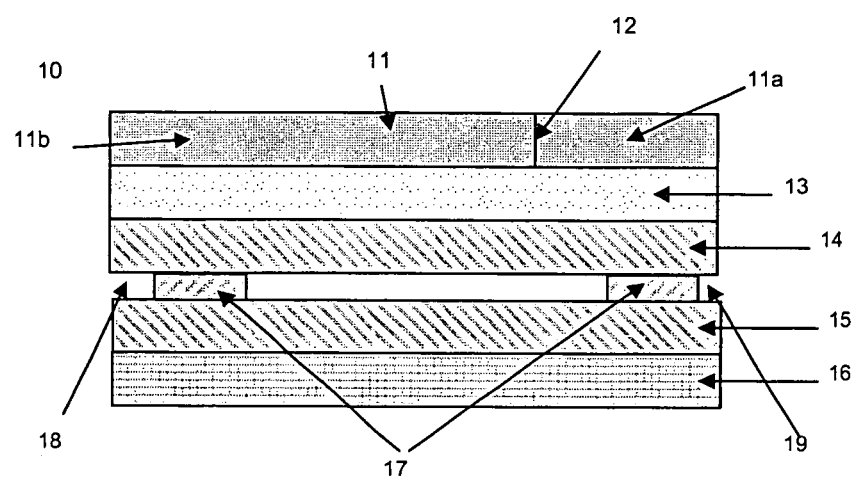

SPLICING TAPE WITH ADJACENTLY DISPOSED STRIPS OF LAMINATING COMPOSITION AND METHOD OF USING THE SPLICING TAPE

BACKGROUND OF THE INVENTION

The invention relates to the use of a splicing tape to equip a wound roll for flying splice, to a splicing method, and to the splicing tapes used in said method.

Flat materials in web form, more particularly paper, are wound into rolls. Such rolls are supplied, for example, to paper-processing machines or to printing and/or packaging machines. In the ongoing operation of such installations it is necessary to locate and appropriately join the start of a new wound roll, in a changeover on the fly, to the end of a first roll of the flat material in web form, without having to halt the high-speed machines when changing the rolls over. This operation is referred to as splicing.

Within the paper industry it is performed using double-sided self-adhesive tapes which consist essentially of a carrier layer and two layers of self-adhesive, to produce a join between the end of the old material web and the start of the new material web. The end of the old material web is bonded in the process to the start of the new material web.

Likewise known are adhesive tapes having a splittable system, comprising a material which separates between top and bottom face when subjected to normal force. EP 1 076 026 A2 describes a splicing tape with fixing aid, the fixing aid consisting of a carrier material which is formed from two co-laminated planar materials, the lamination forming a predetermined breakage point, and the fixing aid being given pressure-sensitive adhesion qualities on its bottom face. EP 1 640 301 A1 likewise describes an adhesive tape for producing a join in flying splice, with a splittable system, the splittable system being composed of two layers which can be separated from one another. An adhesive tape for producing a splice join is described, furthermore, in EP 1 630 116 A2. This adhesive tape comprises a carrier material, which is coated on its top face with a self-adhesive composition and provided on the opposite face with a splittable system, the splittable system opening along a parting plane between two layers. Another splicing tape is described in EP 1 318 962 B1, that tape comprising two substrates joined separably to one another via a layer of adhesive.

The systems described to date are restricted, in some cases very much so, in their applicability. For example, in the case of automated processes, in which the splicing tapes are applied to a wound roll, with the splicing tapes described to date there are often instances of damage in the region of the predetermined breakage point. Furthermore, in the systems specified above, the difficulty exists of setting the splitting system in such a way that on the one hand the risk of unwanted initial splitting in the acceleration phase is avoided, while on the other hand the proper splitting of the splicing tape, without damage to the webs of material to be joined, is ensured. One approach to a solution involves specifically setting the parting forces of a full-area splitting system. In a splitting system configured on a full-area basis, however, the splitting system must always represent a compromise. The reason for this is that, in order to overcome the splitting resistance at the leading edge, an increased, maximum force is required for initial splitting of the system (initial splitting force). Furthermore, a force at a lower level is needed for splitting over the entire width of the splicing tape (split propagation force). The product of the force times the width of the splitting system is the energy needed for splitting (splitting energy). In a full-area system, on the one hand, the initial splitting force must be set high enough that the product does not open prematurely, as a result of the aerodynamic forces and centrifugal forces that act during acceleration, while on the other hand the splitting energy set must be low enough that the required energy for the complete and comprehensive splitting of the splitting system does not result in instances of tearing. With full-area splitting systems in particular, this compromise is difficult to establish. This problem is manifested especially with thin and therefore sensitive systems.

BRIEF SUMMARY OF THE INVENTION

The present invention provides a solution to the stated problems, by providing a new splicing tape which has adjacently disposed strips of laminating composition.

The present invention accordingly provides for the use of a splicing tape to equip a wound roll for flying splice, where (a) the splicing tape comprises a first carrier and a second carrier and also at least two strips of laminating composition disposed between them; each strip joining the first carrier to the second carrier, the carriers having, on their side remote from the strips of laminating composition, a first and a second layer of pressure-sensitive adhesive, the strips of laminating composition being disposed adjacently and in each case forming a predetermined breakage point;

(b) the splicing tape is adhered to the roll in such a way that part of the first layer of pressure-sensitive adhesive forms a first bonding area with the end region of the uppermost ply of the wound roll, and the second layer of pressure-sensitive adhesive, in the transition region from uppermost to second-uppermost ply of the roll, forms a second bonding area to the roll, which is located partly below the first bonding area, where the first bonding area extends within the two longitudinal edges in the longitudinal direction of the splicing tape, and the part of the first layer of pressure-sensitive adhesive that does not form a bonding area with the end region of the uppermost ply of the wound roll is exposed for adhesive coupling to a fast-running web of another, unwinding roll.

By the transition region from uppermost to second-uppermost ply of the roll is meant, in the sense of the present invention, that region of the roll in which the uppermost ply of the wound roll stops and the second-uppermost ply of said roll begins. This region thus encompasses the transition from uppermost to second-uppermost ply of the roll. In accordance with the invention, therefore, the splicing tape is adhered in such a way that the second layer of pressure-sensitive adhesive covers the stated transition. With the roll, then, the second layer of pressure-sensitive adhesive forms a second bonding area, which covers the transition from uppermost to second-uppermost ply of the roll. By end region of the uppermost ply of the wound roll is meant, in the sense of the present invention, the start, i.e., the exposed end, of the wound roll.

The invention further provides the splicing tapes used, wound rolls which comprise the splicing tapes, i.e., are equipped with them, and also a splicing method comprising the use of said splicing tapes, wherein the splicing tape is adhered to the roll in such a way that part of the first layer of pressure-sensitive adhesive forms a first bonding area with the end region of the uppermost ply of the wound roll, and the second layer of pressure-sensitive adhesive, in the transition region from uppermost to second-uppermost ply of the roll, forms a second bonding area to the roll, which is located partly below the first bonding area, where the first bonding area extends within the two longitudinal edges in the longitudinal direction of the splicing tape, and the part of the first layer of pressure-sensitive adhesive that does not form a bonding area with the end region of the uppermost ply of the wound roll is exposed for adhesive coupling to a fast-running web of another, unwinding roll, where the roll of paper thus equipped is accelerated to the same rotational speed as the unwinding roll and is pressed against the web of the unwinding roll, the exposed part of the first layer of pressure-sensitive adhesive bonding to the web of the unwinding roll, while at almost the same time the splicing tape splits at the predetermined breakage point and thus releases the new roll of paper.

The splicing tapes used in accordance with the invention, then, have at least one first carrier and a second carrier, and also at least two strips of laminating composition disposed between said carriers and joining the first carrier to the second carrier, the carriers each having, on their side remote from the strips of laminating composition, a layer of pressure-sensitive adhesive, the strips of laminating composition being disposed adjacently and in each case forming a predetermined breakage point. For this purpose the two carriers are laminated to one another, in the form of two webs, for example. Using a suitable laminating composition, it is possible for this purpose first to apply at least two strips of laminating composition to one of the two carriers, before the other carrier is applied. This assembly is subsequently coated with a pressure-sensitive adhesive on each of the now external sides, in other words top and bottom. In an alternative embodiment, coating with pressure-sensitive adhesives may also take place before the laminating composition is applied. In that case, however, it is necessary to line the adhesive with a liner in each case. The layers of pressure-sensitive adhesive extend preferably over the full area of the entire carrier material. Likewise conceivable is an essentially complete coating of the carriers, which means in each case an 80%-95% coverage of the carriers with a layer of pressure-sensitive adhesive. Also conceivable is only partial application of the pressure-sensitive adhesives to the carriers. In that case, however, it is necessary to ensure effective adhesive bonding to the material to be spliced, during the application. One or both sides of the assembly, in other words both layers of pressure-sensitive adhesive, may then optionally be lined with a release paper (liner).

The laminating composition used may be, for example, one which in addition to a binder comprises low-release, silicone-free additives and also, where necessary, elasticizing additives. It is necessary here to ensure that, even at relatively high temperatures, the dry films do not possess any adhesive force, so that the areas exposed after splitting do not contaminate or remain stuck to machinery parts or production product. For use in paper machines it is desirable for all of the constituents of the splicing tape not to disrupt the repulping of papers. Splicing zones cut out during further processing can then be repulped with no problems. Consequently, water-based compositions of the laminating composition, comprising auxiliaries customary in paper making, are particularly advantageous. Binders which can be used include, for example, modified starches, or binders such as those that have long been in use for wet bonding tapes. Release agents used may be, for example, talc, stearyl derivatives, such as Ca stearate, or dispersions of polymeric release agents, such as dispersions based on copolymers of stearyl methacrylate or stearyl derivatives of maleic acid with styrene, for example. Water-soluble polyglycols, for example, may serve as elasticizing agents. In particular, aqueous preparations with 10%-90% by weight of binder and 10%-90% by weight of release agent and also up to 60% of elasticizing agent may be used as a laminating composition. As binders it is preferred to use starch derivatives, examples being anionic potato starch, in fractions of 30%-70% by weight. Release agents used are preferably talc, Ca stearate and/or release-effect copolymers with stearyl groups, in fractions of 30%-80% by weight. For elasticization, polypropylene glycols or polyethylene glycols, preferably in amounts between 0%-15% by weight, have proven highly suitable. In this context, the products of relatively high molecular mass that are solid at room temperature are used primarily. Further elasticizing agents which can be employed effectively in relatively large proportions are gum arabic and plastics having a similar profile of properties. The laminating composition is coated onto a paper carrier or the like, preferably using an applicator mechanism that is suitable for aqueous dispersions, and in the wet state is lined with a second paper carrier or the like and then dried. As and when required, it is possible to use the measures which are customary in paper making, such as rewetting, calendering, and leveling of the assembly produced. The layer thickness of the laminating composition after drying is situated preferably in a range of 3-20 g/m$^2$.

The individual strips of laminating composition which in accordance with the invention are disposed adjacently and are provided for the generation of the desired predetermined breakage point may in each case be formed as a planarly coherent or partial, non-full-area, i.e., non-planarly coherent application. For this purpose the strips of laminating composition are applied to one of the carriers in each case by means of halftone rollers, screen printing or flexographic printing, and, in the wet state, are laminated together with the second carrier web and dried. The geometry of the screen or of the halftone roller or flexographic printing plate may be selected so as to produce discrete coated areas which on lamination are not pressed together to form a full area. In this case the strips of laminating composition are composed of small discrete dots. Alternatively, the stated coating techniques may also be used to achieve full-area coating. In that case it is necessary only for the coating assemblies to be selected such that the coated laminating composition is formed, on lamination, into a full-area film. Full-area coating may likewise take place in strip coating by means of a wire-wound doctor (Mayer-bar) or nozzle coating.

In the case of material which is produced in screen printing, the design of the screen determines the layer thicknesses of the strips of laminating composition. Preference is given to screens with 14 to 100 mesh and 7%-60% open area. The coating rate in terms of dry laminating composition is set in the 2-20 g/m$^2$ range.

For screen printing, pastelike, nonfoaming aqueous preparations are used which have a relatively high viscosity and whose solids content is composed, for example, of anionic potato starch. Elasticizing additions such as polypropylene glycols or polyethylene glycols and/or release agents can be used as well in amounts which are compatible with the principal constituent. The setting of the splitting forces, i.e., initial splitting force and split propagation force, is determined, in addition to the fraction of release agent, by screen design and solids concentration.

In order to obtain a clean printed image without smearing, the elastic fraction in the flow behavior of the aqueous preparation must be kept small, in order to avoid stringing. This can be achieved, for example, by additions of talc or small amounts of very finely divided silica gel or other thickeners.

Where the strips of laminating composition are applied by means of a halftone roller, the engraving of the halftone roller determines the layer thickness of the strips of laminating composition. It is preferred to use halftone, rollers with a cross-diagonal engraving, especially at a 45° angle, in order to apply individual strips of laminating composition. The volumes of the engravings in this case are situated preferably in the 25-60 cm$^3$/m$^2$ range. Halftone rollers having line halftones with 10-30 lines/cm can also be used, their volumes being situated preferably in the 30-90 cm$^3$/m$^2$ range. In order to coat discrete areas, preference is given to co-rotation between paper carrier and halftone roller.

In the case of coating using a halftone roller, fluid, non-foaming aqueous preparations are used whose solids content is composed, for example, of anionic potato starch. Elasticizing additions such as polypropylene glycols or polyethylene glycols and/or release agents can be used as well in amounts which are compatible with the principal constituent. The setting of the splitting forces, i.e., initial splitting force and split propagation force, is determined, as well as the fraction of release agent, by the engraving of the halftone roller and the solids concentration.

By tailoring the amount of the laminating composition within the strips of laminating composition it is possible to set varying splitting forces within these strips. Furthermore, the intended strips of laminating composition may have splitting forces that are different from one another. In one embodiment, for this purpose, the different strips of laminating composition are given different widths. In one preferred embodiment, the strip of laminating composition that is to the rear in the application direction of the splicing tape is wider than the strip of laminating composition which is at the front in the application direction, i.e., the first strip of laminating composition, or than the other strips of laminating composition on the splicing tape. The width of the individual strips of laminating composition is situated preferably in a range from 5 to 15 mm, more preferably in a range from 7 to 10 mm.

Likewise conceivable is an embodiment in which the splitting forces of the strips of laminating composition, which have substantially identical width, are tailored through the use of different laminating compositions. Also conceivable is an embodiment in which the layer thicknesses differ between the strips of laminating composition, likewise allowing the splitting forces to be set to different values.

The strips of laminating composition are disposed between the first and second carriers of the splicing tape in such a way that they themselves are not in direct contact with one another. This means that the strips of laminating composition are disposed at a defined distance from one another. The distance between the strips of laminating composition is a product of the width of the splicing tape and the width of the individual strips of laminating composition. The strips of laminating composition are preferably disposed at as far as possible a distance from one another. The effect of this is that the time interval between the splitting of the individual strips of laminating composition in the course of a flying splice becomes as large as possible. The adjacently disposed strips of laminating composition are preferably two strips of laminating composition which are disposed at the stated distance from one another.

In one preferred embodiment, the strips of laminating composition cover less than in each case 80% of the surfaces of the first and second carriers of the splicing tape which they join to one another, preferably less than 70%, more preferably less than 60%.

In one embodiment of the invention, the initial splitting force required to split the strip of laminating composition that is at the front in the application direction, i.e., the first strip of laminating composition, on the splicing tape, when the resulting split halves are separated at an angle of 90° to the laminated assembly, i.e., at an angle of 90° to the application direction of the splicing tape, at a speed of 300 mm/min, is 75 cN per centimeter of bonding width, preferably 70 cN, more preferably 65 cN, and the energy required to split the strip of laminating composition which is at the front in the application direction is not more than 50 Nmm (measured at 23° C. and 50% rh using a Zwick Roell Z2.5 measuring instrument, the measurement being carried out on a 5 cm wide strip of a splicing tape whose two strips of laminating composition have a width of in each case 10 mm, bonded transversely to the measurement direction on the T-block of the measuring instrument, with the top layer of adhesive covered with commercial 80 g/m$^2$ copier paper which for the purpose of measurement has been clamped into the clamping jaw). The initial splitting force and splitting energy required to split the strip of laminating composition that is at the back in the application direction may be higher than the values specified in relation to the front strip of laminating composition.

The strips of laminating composition may represent linear strips or may have, for example, a wavelike profile. In one preferred embodiment, the strips of laminating composition are in the form of linear strips.

In one preferred embodiment, the strip of laminating composition that is formed from the laminating composition and is at the front in the application direction does not finish flush with the carriers that are coated with pressure-sensitive adhesive. In the application direction, i.e., in the direction of rotation of the roll equipped with the splicing tape, this splitting strip is recessed, i.e., set back somewhat. The effect of this is that, at the instant of splicing, first of all the joining of the running web of the unwinding roll to the first layer of pressure-sensitive adhesive of the splicing tape of the invention applied to the wound roll is produced, and subsequently, with somewhat of a time delay, the cohesive splitting of the strips of laminating composition begins. The offset of the front strip of laminating composition in relation to the edges of the splicing tape carriers that are at the front in the application direction is advantageously up to 20 mm, preferably up to 15 mm, e.g., 1 to 3 mm, more preferably 2 mm.

As carriers it is possible to select any desired carrier materials, more particularly carrier papers or films, it being possible in accordance with the invention for the first and second carriers to be alike or different. In one embodiment, the carrier which is coated with the strips of laminating composition in the provision of the splicing tape of the invention is selected such that coating of the laminating composition is readily possible. Thus, in one particularly preferred embodiment, paper is used as the carrier material, and is selected such that the laminating composition penetrates into the paper without penetrating through it. In one particularly preferred embodiment, the first and/or second carriers of the splicing tape are paper carriers.

The grammage of the individual carriers is situated preferably in a range from 30 to 80 g/m$^2$. The thickness is situated preferably in a range from 30 to 100 μm. In principle, the carrier materials selected ought to be as thin as possible. The thinner an adhesive splicing tape is, the less the extent to which the adhesive tape interferes with passage through the machines. If the thickness of the individual carriers is above the stated range, it may be the case, depending on the process, that problems will occur on passage through the machines. Where the thickness of the carriers, however, is below the stated range, there may—depending on the web tension—be instances of unwanted tearing, if the tensile strength of the adhesive tape is lower than the web tensions in the processing machine.

For the majority of applications in the paper industry, machine-finished paper having a thickness of 30 μm to 80 μm, preferably 40 to 65 μm, more preferably 50 μm, has emerged as being a suitable carrier material. In the case of the splicing of relative thick materials, such as of papers of more than 200 g/m² or of boards, for example, for the production of beverage cartons, it is also possible to employ thicker carrier materials.

If wet lamination is not possible with very thin carriers, hotmelt adhesives as well can be used as laminating compositions for the strips of laminating composition, preferably repulpable materials based on polyvenylpyrolydone and/or corresponding copolymers or hydroxidepropylcellulose, blended with polar waxes, resins, and release waxes such as, for example, stearic acid, and, as and when required, with preferably water-soluble plasticizers. When one of the carrier webs has been coated in strip form with such a hotmelt adhesive as laminating composition, the second web is laminated on thermally. The hotmelt adhesive ought as far as possible to have high softening ranges above 120° C., so that, on contact with hot drying cylinders, in the paper machine, for example, as far as possible no particles of hotmelt adhesive are deposited on these areas. Since hotmelt adhesives are classed in paper making as potential contaminants, the use of this variant of lamination is not preferred.

As a pressure-sensitive adhesive for the first layer of pressure-sensitive adhesive it is preferred to employ a high-tack adhesive which preferably is repulpable. High tack in this contact means that the pressure-sensitive adhesive in the end product has a rolling-ball tack of less than 40 mm. This value is determined by applying the pressure-sensitive adhesive in question to a standard polyester carrier (thickness 23 μm) with a pressure-sensitive adhesive layer thickness of 50 g/m². A strip of the adhesive tape approximately 10 cm in length is fastened horizontally, with the adhesive side upward, on the test plane. A steel sample ball (diameter: 11 mm; mass: 5.6 g) is cleaned with acetone and conditioned for 2 hours under ambient conditions (temperature: 23° C.+/−1° C.; relative humidity: 50%+/−1%). For the measurement, the steel ball is accelerated by rolling it down a ramp which is 65 mm high (angle of inclination: 21°) under the Earth's gravitational field. From the ramp the steel ball is steered directly onto the tacky surface of the sample. The distance traveled on the adhesive until the ball reaches standstill is measured, this being the rolling-ball tack. The measurement value in each case (reported as length in mm) is a product of the average value from five individual measurements.

The layer thickness of the first layer of pressure-sensitive adhesive is preferably 30-60 g/m².

In the sense of the present invention it is particularly advantageous, as adhesive for the first layer of pressure-sensitive adhesive, to use an adhesive comprising 25-45% by weight of a copolymer (a) and also 55-75% by weight of a plasticizer (b), the copolymer (a) being obtainable by copolymerization of a mixture comprising 30-70% by weight of acrylic acid, 15-35% by weight of butyl acrylate, and 15-35% by weight of ethylhexyl acrylate, and the plasticizer (b) used being an ethoxylated C16 to C18 alkylamine containing preferably 15 to 25 ethoxy units in the alkyl radical, an example being Ethomeen C/25® from Akzo Nobel.

For the second layer of pressure-sensitive adhesive it is preferred to use a pressure-sensitive adhesive which possesses shear strength and is preferably likewise repulpable. In the sense of the present invention, a pressure-sensitive adhesive possessing shear strength is understood to be a pressure-sensitive adhesive which has a static shear strength of more than 400 minutes on coating base paper and more than 1000 minutes on gravure paper at 23° C. and 55% relative humidity.

For the measurement of these values, the adhesives under test are applied to a standard carrier (polyester film, thickness: 25 μm) at a coat weight of 25 g/m².

After drying and optional crosslinking of the adhesive, a strip 13 mm wide and at least 20 mm long is cut out and adhered to a defined paper (e.g., Neopress T 54 gravure paper, 54 g/m², or Mediaprint coating base paper, 135 g/m², from Stora Enso). The bonding area is 13 mm×20 mm. In order to ensure a constant applied pressure when adhering, the test specimen is rolled over slowly twice with a 2 kg roller. The test specimen produced in this way is loaded with a 1 kg weight parallel to the plane of bonding at 23° C. and 55% relative humidity, and a measurement is made of the time for which the adhesive strip remains on the paper.

In one embodiment of the invention, the pressure-sensitive adhesive possessing shear strength that is used for the second layer of pressure-sensitive adhesive on the splicing tape is an acrylate self-adhesive comprising 25-45% by weight of a copolymer (a') and also 55-75% by weight of a plasticizer (b'), the plasticizer (b') used being an ethoxylated C16 to C18 alkylamine containing preferably 15 to 25 ethoxy units in the alkyl radical, an example being Ethomeen C/25® from Akzo Nobel. The copolymer (a') is obtainable in a free-radical polymerization reaction in polar solvents with ethanol as regulator, optionally with use of an aluminum chelate as crosslinker (0.3% to 1.2% by weight, based on the Iotal amount), from a monomer mixture comprising 40-90% by weight of acrylic acid and also up to 60% by weight of butyl acrylate, and optionally up to 30% by weight of ethylhexyl acrylate. A preferred copolymer (a') is obtainable from a monomer mixture comprising 40-90% by weight of acrylic acid and also 10-60% by weight of butyl acrylate. A likewise preferred copolymer (a') is obtainable from a mixture comprising 40-90% by weight of acrylic acid, 15-35% by weight of butyl acrylate, and also 15-35% by weight of ethylhexyl acrylate.

The layer thickness of the second layer of pressure-sensitive adhesive is preferably 15-30 g/m².

In one preferred embodiment of the invention, the first and/or second layers of pressure-sensitive adhesive are disposed over the full area of the first or second carrier of the splicing tape.

In a further embodiment of the invention, the layers of pressure-sensitive adhesive are lined with a release paper (liner), i.e., with releasing carrier material, for example with double-sidedly releasing carrier material such as siliconized paper, for example. In one particular embodiment of the invention, a double-sidedly releasing carrier material is used. In this case it is sufficient to insert only one such carrier material, i.e., only one single liner, and to wind the splicing tape thus lined up into rolls.

In accordance with the invention the splicing tape may be provided in different embodiments. The width of the splicing tape is not subject to any particular restrictions, but is situated preferably in a range from 20 mm to 100 mm, more preferably in a range from 30 mm to 80 mm, more preferably of 38 mm-75 mm. This width is particularly suitable for use for flying splice. In the case of very fast machines (paper making coating machines) or of materials in web form which are difficult to bond, such as nonpolar films such as PE or PP, for example, relatively broad splicing tapes are required. For slower machines or easy-to-bond substrates, as is the case for the majority of paper types, for example, the widths of the splicing tape may be reduced.

In the text below, the invention is described in more detail with reference to an exemplary embodiment, without wishing hereby to subject the invention to any restriction.

BRIEF DESCRIPTION OF THE SEVERAL VIEWS OF THE DRAWING(S)

FIG. 1 shows a diagrammatic side view of a splicing tape used in accordance with the invention.

DETAILED DESCRIPTION OF THE INVENTION

In particular, FIG. 1 shows a splicing tape (10) having two carriers (14, 15) which are laminated together by means of two strips (17) of laminating composition. Applied to the top face of the first carrier 14 is a first layer of pressure-sensitive adhesive (13). Since this layer, in subsequent application, produces contact between the expiring web of the unwinding roll and the new material web of the wound roll, this adhesive advantageously has a high-tack formulation. Applied to the bottom face of the second carrier is a second layer (16) of pressure-sensitive adhesive on the paper carrier (15). The pressure-sensitive adhesive used for this layer has a high shear, strength.

The layer 13 of adhesive is lined with a release medium (11). In the present exemplary embodiment, the release medium 11 has a slot (12), so that, by separate removal of the two release media (11a, 11b), two defined regions are formed on the adhesive 13. In the application, it is possible first to remove the smaller region (11a), and the end region of the uppermost ply of the wound roll is adhered to the exposed sub-region of the layer 13 of adhesive below it. After the second layer (16) of pressure-sensitive adhesive has been adhered to the transition of uppermost to second-uppermost ply of the roll, i.e., in the transition region from uppermost to second-uppermost ply of the roll, the larger region (11b) is then removed, and so the larger area of the layer 13 of pressure-sensitive adhesive is available for flying splice.

The strips (17) of laminating composition are offset (18, 19) from the edges to the middle of the splicing tape. The front offset in the application direction is needed in order to separate the moment of adhesional attachment of the new web from the temporal beginning of the splitting process of the first strip of laminating composition. The degree of the offset is dependent on the application speed and on the materials to be spliced. For use at high speeds (up to 1800 m/min), the offset is preferably 1 mm to 3 mm, more preferably 2 mm. For flying splice on calenders and winders, at speeds of 50 m/min-100 m/min, an offset of, for example, up to 15 mm may be selected. The rear offset (19) ought in principle to be selected to be as small as possible, since another purpose of the rear strip of laminating composition is to ensure a reliable bond, with no play, of the splicing tape to the uppermost ply of the wound roll. The closer the strip can be positioned at the end of the adhesive tape, the more reliable the bond can be made. However, the strip ought not to protrude beneath the carriers 14, 15, and so the offset 19 may be a product of the accuracy of coating and accuracy of laminating in the production equipment.

In accordance with the invention it is possible to provide a splicing tape which, in spite of a splitting system which is not a full-area system, in the form of at least two strips of laminating composition, has a relatively high initial splitting force, as a result, for example, of a relatively high coat weight of the laminating composition, with the result that higher speeds are possible when splicing, because the more highly splitting system is able to withstand greater centrifugal forces and aerodynamic forces. Furthermore, the splicing tape used in accordance with the invention has the advantage that it is width-independent, since the energy required to split the splicing tape (splitting energy) is defined by the width of the strips and not by the width of the adhesive splicing tape itself.

What is claimed is:

1. A method for using a splicing tape to equip a wound roll for flying splice, said method comprising the steps of:
    (a) providing a splicing tape comprising:
        a first carrier and a second carrier,
        at least two strips of a water-based laminating composition disposed between the first carrier and the second carrier,
        each strip of the at least two strips of the laminating composition directly contacting both the first carrier and the second carrier and thereby joining the first carrier to the second carrier,
        the first and second carriers each having, on a side remote from the at least two strips of the water-based laminating composition, a first layer and a second layer of a pressure-sensitive adhesive, and
        the first and second carriers each being continuous layers, wherein the at least two strips of laminating composition are not in direct contact with each other, the at least two strips of laminating composition are not in direct contact with any other strips of laminating composition in the splicing tape, and the at least two strips of laminating composition form a predetermined breakage point;
    (b) adhering the splicing tape to a roll in such a way that part of the first layer of pressure-sensitive adhesive forms a first bonding area with the end region of the uppermost ply of the wound roll, and the second layer of pressure-sensitive adhesive, in the transition region from uppermost to second-uppermost ply of the roll, forms a second bonding area to the roll, located partly below the first bonding area, where the first bonding area extends within the two longitudinal edges in the longitudinal direction of the splicing tape, and the part of the first layer of pressure-sensitive adhesive that does not form a bonding area with the end region of the uppermost ply of the wound roll is exposed for adhesive coupling to a fast-running web of another, unwinding roll.

2. The method as claimed in claim 1, wherein the splicing tape has two strips of laminating composition disposed between the first carrier and the second carrier.

3. The method as claimed in claim 1, wherein the first and/or second carrier of the splicing tape is a paper carrier.

4. The method as claimed in claim 1, wherein the at least two strips of laminating composition are in the form of linear strips.

5. The method as claimed in claim 1, wherein the first and/or second layer of pressure-sensitive adhesive is disposed over the full area of the first or second carrier.

6. The method as claimed in claim 1, wherein the at least two strips of laminating composition cover less than in each case 80% of the surfaces of the first and second carriers.

7. A splicing tape for equipping a wound roll for flying splice, comprising:
    a first carrier and a second carrier,
    at least two strips of a water-based laminating composition disposed between the first carrier and the second carrier,
    each strip of the at least two strips of the laminating composition directly contacting both the first carrier and the second carrier and thereby joining the first carrier to the second carrier,
    the first and second carriers each having, on a side remote from the at least two strips of the water-based laminating composition, a first layer and a second layer of a pressure-sensitive adhesive, and
    the first and second carriers each being continuous layers, wherein the at least two strips of laminating composition are not in direct contact with each other, the at least two strips of laminating composition are not in direct contact with any other strips of laminating composition in the splicing tape, and the at least two strips of laminating composition form a predetermined breakage point.

8. The splicing tape according to claim 7, wherein the at least two strips of laminating composition have been applied to the first carrier by halftone rollers, screen printing or flexographic printing.

9. A wound roll of a splicing tape comprising a first carrier and a second carrier, at least two strips of a laminating composition disposed between them, the first and second carriers each being continuous layers, each strip of the at least two strips of the laminating composition directly contacting both the first carrier and the second carrier and thereby joining the first carrier to the second carrier, the first and second carriers each having, on a side remote from the at least two strips of the laminating composition, a first layer and a second layer of a pressure-sensitive adhesive, wherein the at least two strips of laminating composition are not in direct contact with each other, the at least two strips of laminating composition are not in direct contact with any other strips of laminating composition in the splicing tape, and the at least two strips of laminating composition form a predetermined breakage point.

10. The wound roll according to claim 9, wherein the at least two strips of laminating composition have been applied to the first carrier by halftone rollers, screen printing or flexographic printing.

11. A splicing method comprising using a splicing tape as claimed in claim 9, comprising the step of adhering the splicing tape to a wound roll in such a way that part of the first layer of pressure-sensitive adhesive forms a first bonding area with the end region of the uppermost ply of the wound roll, and the second layer of pressure-sensitive adhesive, in the transition region from uppermost to second-uppermost layer of the roll, forms a second bonding area to the roll, which is located partly below the first bonding area, where the first bonding area extends within the two longitudinal edges in the longitudinal direction of the splicing tape, and the part of the first layer of pressure-sensitive adhesive that does not form a bonding area with the end region of the uppermost ply of the wound roll is exposed for adhesive coupling to a fast-running web of another, unwinding roll, where the roll of paper thus equipped is accelerated to the same rotational speed as the unwinding roll and is pressed against the web of the unwinding roll, the exposed part of the first layer of pressure-sensitive adhesive bonding to the web of the unwinding roll, while at almost the same time the splicing tape splits.

* * * * *